(12) United States Patent
Koyama

(10) Patent No.: US 6,961,926 B2
(45) Date of Patent: Nov. 1, 2005

(54) SYSTEM AND METHOD FOR DISTRIBUTED DEBUGGING AND RECORDING MEDIUM ON WHICH CONTROL PROGRAMS ARE RECORDED

(75) Inventor: Kazuya Koyama, Tokyo (JP)

(73) Assignee: NEC Corporation, Tokyo (JP)

( * ) Notice: Subject to any disclaimer, the term of this patent is extended or adjusted under 35 U.S.C. 154(b) by 611 days.

(21) Appl. No.: 09/734,849

(22) Filed: Dec. 13, 2000

(65) Prior Publication Data

US 2001/0004766 A1 Jun. 21, 2001

(30) Foreign Application Priority Data

Dec. 15, 1999 (JP) ................................. 11-355386

(51) Int. Cl.[7] .............................................. G06F 9/44
(52) U.S. Cl. ...................... 717/129; 717/127; 709/221; 709/222; 709/226
(58) Field of Search ........................ 717/116, 124–129; 707/10; 709/200, 220–226

(56) References Cited

U.S. PATENT DOCUMENTS

| | | | | |
|---|---|---|---|---|
| 5,603,031 A | | 2/1997 | White et al. ................. | 709/317 |
| 5,754,785 A | * | 5/1998 | Lysik et al. .................. | 709/222 |
| 5,819,093 A | | 10/1998 | Davidson et al. ........... | 717/126 |
| 6,016,393 A | | 1/2000 | White et al. ................. | 709/315 |
| 6,042,614 A | | 3/2000 | Davidson et al. ........... | 717/116 |

FOREIGN PATENT DOCUMENTS

| | | |
|---|---|---|
| JP | 5-197586 | 8/1993 |
| JP | 5-224984 | 9/1993 |
| JP | 5-324394 | 12/1993 |
| JP | 5-346912 | 12/1993 |
| JP | 7-182174 | 7/1995 |
| JP | 8-185378 | 7/1996 |
| JP | 8-272644 | 10/1996 |
| JP | 9-120366 | 5/1997 |
| JP | 2782971 | 5/1998 |
| JP | 11-203140 | 7/1999 |

OTHER PUBLICATIONS

Sun Product Documentation, http://docs.sun.com/db/doc/802-3645/6i7hcmka4?a=view, p. 3.*

* cited by examiner

Primary Examiner—Kakali Chaki
Assistant Examiner—Lawrence Shrader
(74) Attorney, Agent, or Firm—Foley & Lardner LLP

(57) ABSTRACT

For a distributed and transparent debugging environment, a controller and an executor, each which accepts operations from a user, are disposed on each of plural computers. The controller and the executor each has a setting-status manager for managing the setting of a debugger and an execution-status manager for managing the execution status of a debugger. In response to a status change, the controller and the executor each notifies other computers of the content of the change via the network. A process manager manages a debug object program according to the content of setting and sets an operation status change due to detection of a break point to an execution-status manager. Meanwhile, the process manager changes its operation in response to a change in execution status sent from another computer.

25 Claims, 13 Drawing Sheets

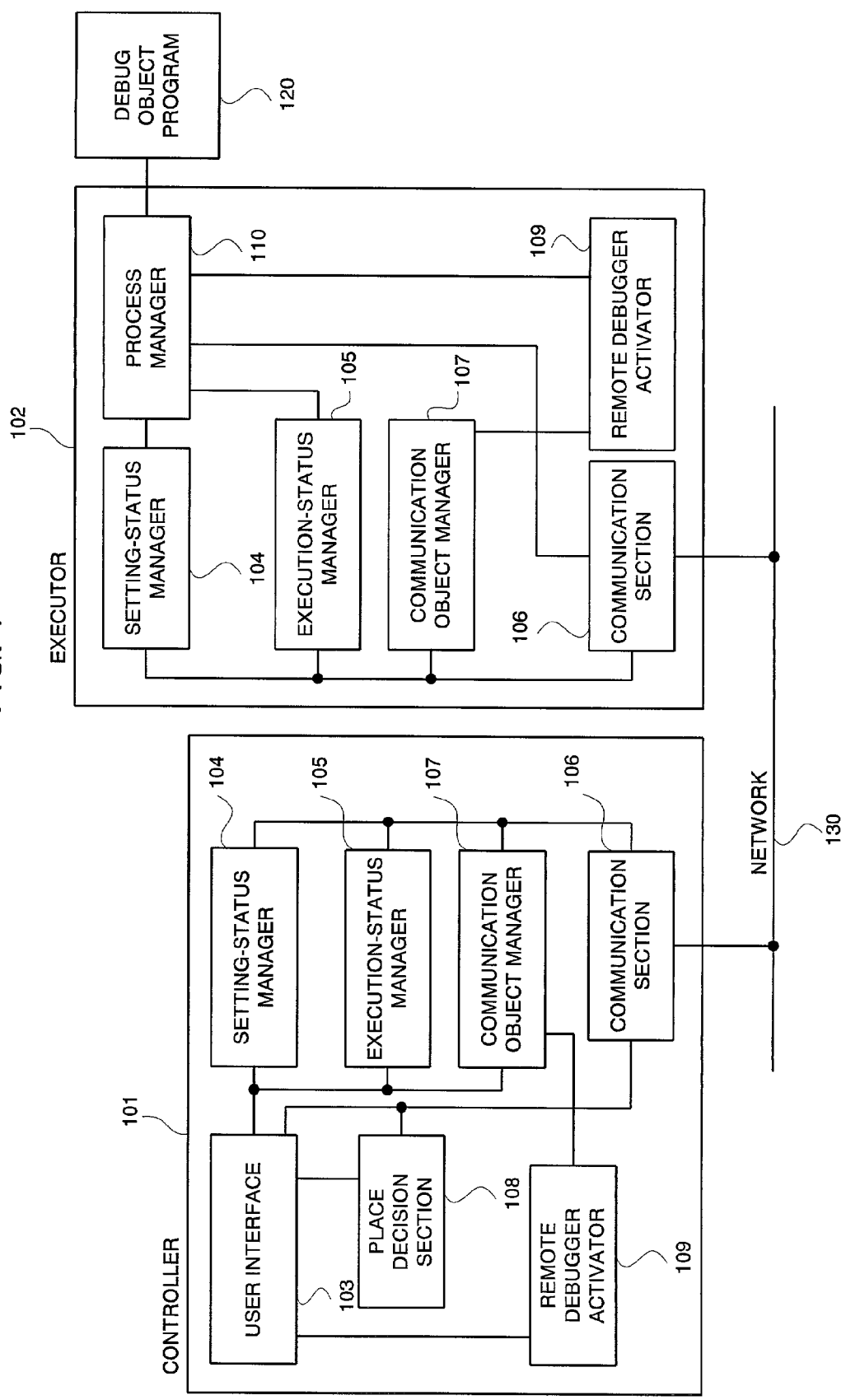

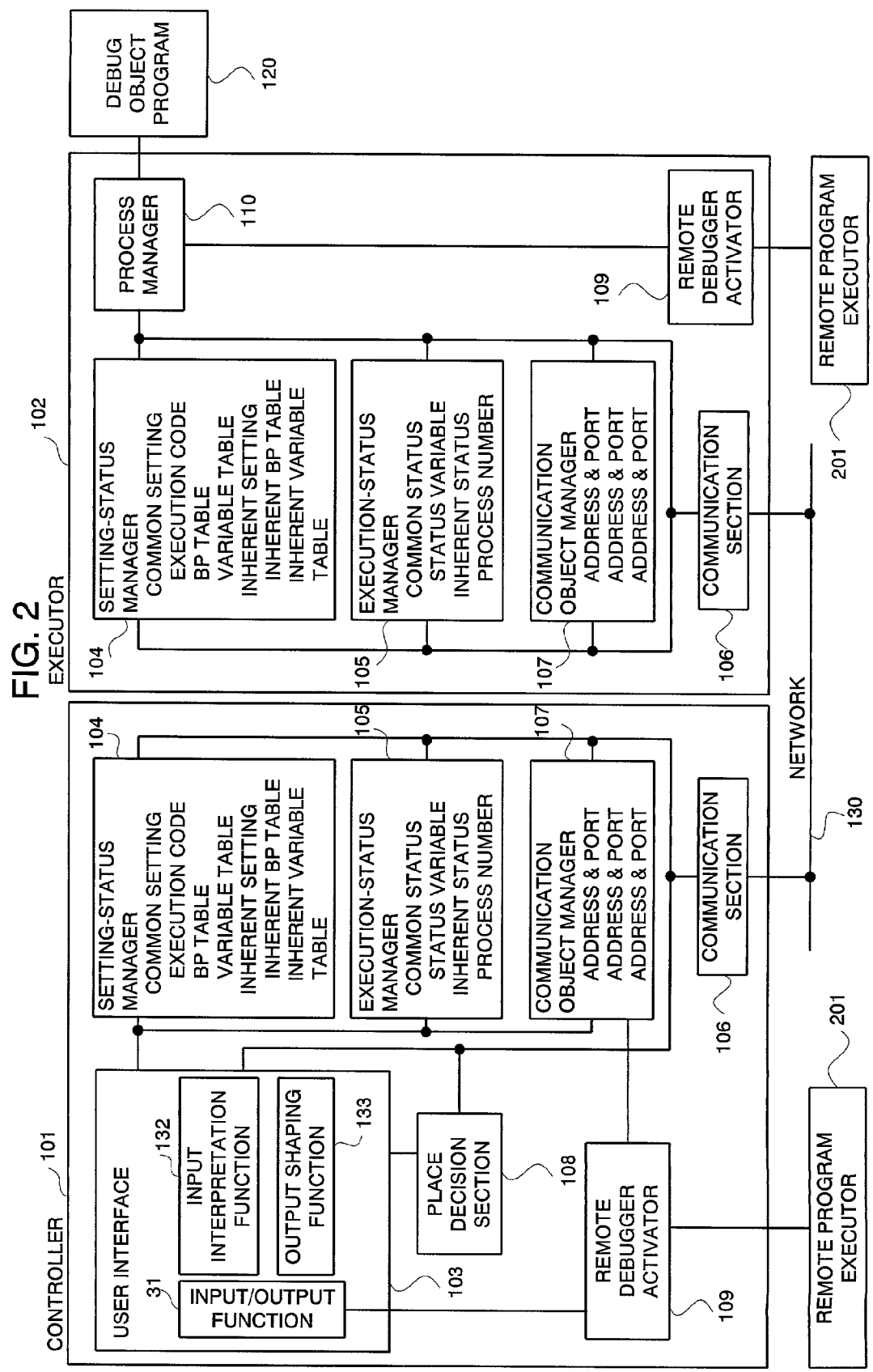

FIG. 3

| INPUT | OPERATION |
|---|---|
| SPECIFICATION OF DEBUG OBJECT PROGRAM<br>ADDITION OF BREAK POINT<br>DELETION OF BREAK POINT<br>ADDITION OF VARIABLE MONITORING<br>DELETION OF VARIABLE MONITORING | NOTIFICATION TO SETTING-STATUS MANAGER |
| BEGINNING OF EXECUTION<br>TEMPORARY HALT OF EXECUTION<br>END OF EXECUTION<br>STEP EXECUTION | NOTIFICATION TO EXECUTION-STATUS MANAGER |
| DISPLAY OF STACK STATUS<br>DISPLAY OF VARIABLE STATUS | TO DECIDE STATUS EXISTENCE PLACE IN PLACE STATUS AND TO REQUEST STATUS TO PROCESS MANAGER AND TO OUTPUT STATUS WITH OUTPUT SHAPING FUNCTION |

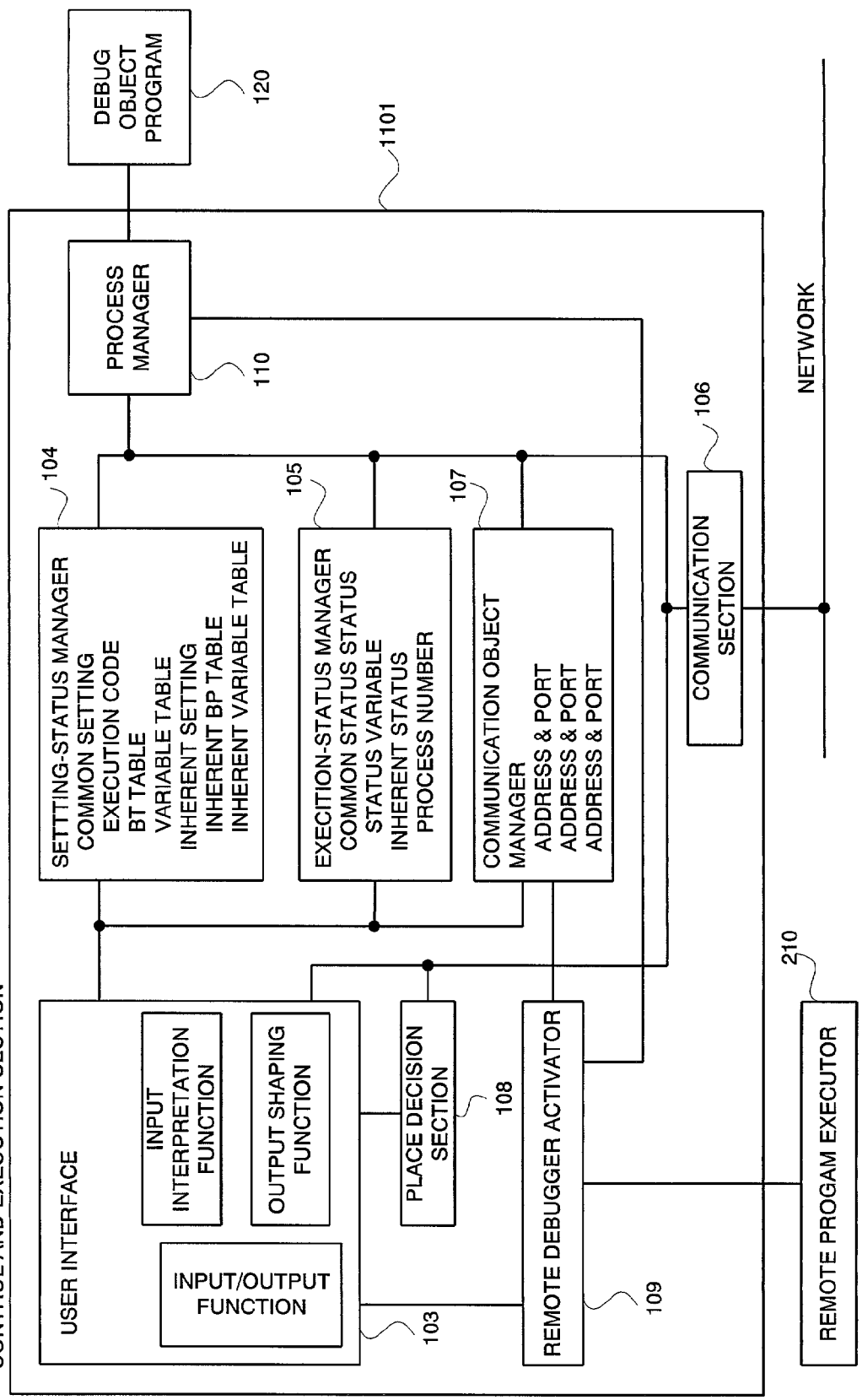

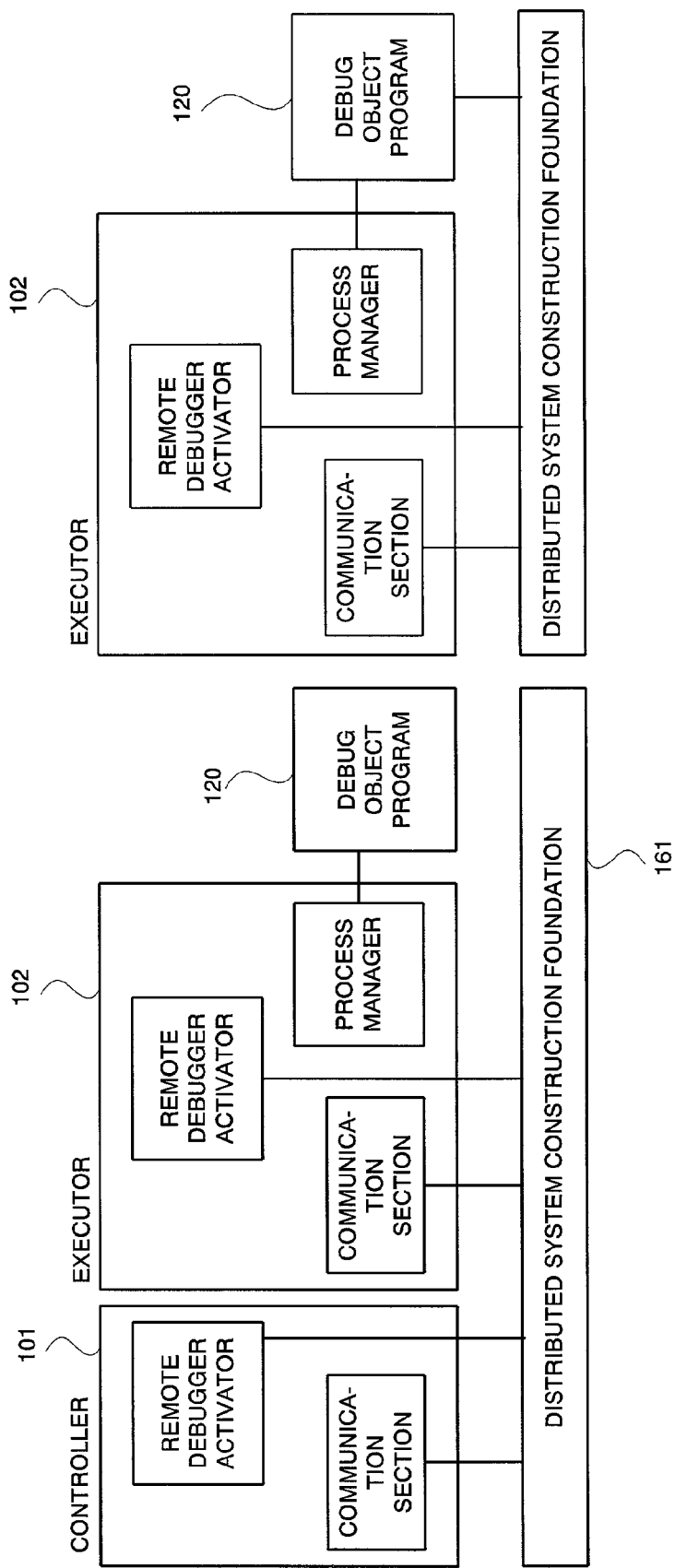

SYSTEM AND METHOD FOR DISTRIBUTED DEBUGGING AND RECORDING MEDIUM ON WHICH CONTROL PROGRAMS ARE RECORDED

BACKGROUND OF THE INVENTION

The present invention relates to a system and method for debugging the software which facilitates the development of software which runs on plural different computers inter-linked via a network. The present invention also relates to a recording medium. Particularly, the present invention relates to a distributed debugger system and debugging method that can easily debug, in execution, programs described for the distributed transparent technique which makes a program recognize as if computers inter-linked via a network are virtually one computer. Moreover, the present invention relates to a recording medium on which control programs are recorded.

Distributed System Configuration Foundation:

Conventionally, in order to construct a distributed system that executes processing between plural computers, a software module is created for each of the computers so that communications are accomplished between the computers. A typical example of the distributed system is a client/server system. In this system, a client program and a server program, respectively described, are distributed to different computers. Each program is executed on the corresponding computer. For that reason, the programmer has to design and create communication constructions between modules, in addition to processing of the system itself. This makes difficult to realize the client/server system.

Recently, some distributed construction foundations have been utilized as the technique of easily constructing the distributed systems. The technique called a distributed object is known as one of distributed system construction foundations. This is the technique by which objects on different computers can be manipulated in a manner similar to that to an object on the same computer, in an object-oriented system. In the object-oriented system, a program is executed by sequentially invoking the procedures called "method" of an object. In the distributed object, an object of a method calling destination can be described in a program source code within the computer for the object or on a different computer, in a manner similar to that to the object of the calling source. Hence, if object groups are once distributed on plural computers, a programmer can easily describe programs for a distributed system, without recognizing allocation of objects and an occurrence of communications necessary for an access to objects on different computers after the allocation. CORBA defined the object management group (OMG) and Java-RMI defined by Sun Microsystems Inc. are listed as typical examples of the distributed object technique.

The technique called agent migration is known as another distributed system construction foundation. In this technique, when an instruction "migration" is invoked during execution of an executor of a computer program called agent on a computer, the executor is moved onto another computer while the execution status of the agent at the time of invoking is maintained. Thereafter, the execution can be resumed immediately after the instruction is invoked at the migration destination. The use of agent migration allows a process wanting execution on plural computers to be easily described, like the program executed on a single computer, by merely inserting instruction "migration" into an arbitrary place of a program. Telescript disclosed in JP-A No. 182174/ is listed as typical examples of the agent migration.

In the above two techniques regarding distributed object and agent migration, the common concept is "distributed transparency" that a distributed system can be easily constructed by apparently handling plural computers interconnected via a network as a single computer. By utilizing the distributed system construction foundation which provides the distributed transparency, it is possible to avoid the difficulty in resulting from distribution among difficulties in describing programs for distributed systems, for example, difficulty in describing communications between modules or difficulty in recognizing how various types of information or resources within a distributed system are allocated on plural computers.

Parallel Execution:

In order to operate the distributed system efficiently, parallel execution of the distributed system becomes effective. Generally, a single computer has a CPU resource and a memory resource such as a primary memory or a secondary memory and can independently operate without being influenced by others. When two computers are required to implement a computation process respectively, they may implement a simultaneous and parallel computation and then compile the results after completion of the computation. This process can realize a faster computation, compared with the sequential execution in which after one computer first performs the computation process, the other computer performs the computation process.

Generally, there is the disadvantage in that information transfer rate or execution rate at which information is exchanged between different computers via a network is very slow, compared with exchanging information via the primary memory within a single computer. For that reason, in the case of the program which requires an access to a remote computer and a computational process inside a computer, it is preferable to execute both the processes in parallel and to make the CPU execute a computational process inside the computer during a waiting time for an access to the remote computer, compared with the continuous sequence of one process and the other process. Thus, the computational capability of the CPU can be used effectively and fully. The multithread is broadly known as the technique of paralleling the process within the program.

(Distributed Debugger System)

The use of the distributed transparency technique or multithread technique enables effective programs to be easily described. In an actual system construction, it is important to debug the described program. There is the method of using the device called the source level debugger as a conventional debugging method used broadly. According to this method, while a program to be debugged is being actually run, the debugger monitors it. The debugger sets a break point, temporarily halts the execution at an arbitrary location, and displays the execution stack of the program in temporary halt state or the content of a variable. The debugger also monitors an arbitrary variable and displays it if the variable is changed. Thus, the program execution status can be easily grasped.

However, the conventional source level debugger intends only the program running on a single computer. When it is tried to debug a distributed system operated on plural computers, it is necessary to respectively activate plural source level debuggers of respective computers and to manipulate each source level debugger through each corresponding user interface. This makes it difficult to utilize the source level debugger.

Some distributed system debugging techniques are proposed to solve the above-mentioned problems. JP-A No. 203140/1999 discloses the debugging technique for agent migration that automatically activates the agent debugger at a migration destination. This eliminates activating the debuggers on all computers in advance when an agent migrating on plural computers is debugged.

In the technique disclosed in JP-A No. 120366/1997, when a distributed object system activates the method of a remote object, the step execution function of the debugger can be used in distributive and transparent mode over two computers to debug the method. Moreover, even when a method activation source does not recognize a remote object existence place, the place can be specified and debugged. Thus, even when processing is performed over plural computers, the step execution function can be used in a distributive and transparent mode, without knowing the distribution of the process.

JP-A No. 272644/1996 discloses the technique of transmitting a process request with debugging to a remote computer to automatically activate the debugger that debugs a process activated on the remote computer and then issuing a debug command to the debugger. JP-A No. 346912/1993 discloses the technique of manipulating plural debuggers, each which operates on a remote computer, through a single interface.

Other examples of that type of technique are disclosed in JP-A No. 224984/1993, JP-A No. 324394/1993, JP-A No. 185378/1996, Japanese Patent Publication No. 2782971, and JP-A No. 197586/1993.

In order to manipulate plural debuggers operated on plural computers, it is basically necessary to set them respectively. In the prior art, the debugger on each computer is automatically activated. However, each debugger is independently activated and can be merely operated easily via a common user interface.

In the techniques disclosed in JP-A No. 203140/1999, JP-A No. 272644/1996, and JP-A No. 346912/1993, the debugger automatically activates at a remote place. An activated debugger is independent of other debuggers and nothing is considered to the content of setting. In the technique disclosed in JP-A No. 120366/1997, a break point is automatically set to other debuggers in a limited process such as step execution. However, that function only does not require any individual operation.

A further problem is that the execution status of a debugger operating on each of plural computers is managed every computer and that a change in execution status on a computer is not reflected to other computers, except the user interface. In the prior art, a program to be debugged runs inside a single computer only. However, when a single program is executed over plural computers, the operation of a communication destination or a parallel operation of another process on a different computer is not considered. When there is no parallel operation within a distributed system to be debugged, only the computers in an operating state at that time are stopped, so that any trouble does not occur in the process on other computers (not operated). However, when the system that operates in parallel over plural computers is debugged, a break point is detected on any one of computers. When a process temporarily halts on the computer, the execution continues without ceasing the process on other computers. As a result, it becomes difficult to grasp the entire state of the system.

In the technique disclosed in JP-A No. 120366/1997, it is considered to execute a single program over plural computers is considered. However, that art does not have the function of dealing with the parallel operation of a program. In the technique disclosed in JP-A No. 120366/1997, it is considered that the server is a multithread system and the technique relates to parallel processing inside a computer as a server. However, this technique does not consider the distributive processing such that one client executes the parallel processing to plural servers.

In any one of the above-mentioned prior arts, users must use debugger system, with knowledge that debuggers or debug objected systems are distributed over plural computers. Users cannot enjoy the advantage of the distributive transparency that is provided by the distributed system construction foundation during debugging. The technique of solving the above-mentioned problems is not disclosed even in other disclosed patent publications.

SUMMARY OF THE INVENTION

An objective of the present invention is to provide a debugging environment with higher distributed transparency to programmers and facilitates the debugging of distributed system.

Another objective of the invention is to provide a distributed debugging environment where the setting and execution status of the debugger system can be managed as if a certain program for a single computer is executed and debugged on a single computer, without making a programmer be conscious of distribution to plural distributed computers.

In order to solve the above-mentioned problems, according to the first aspect of the present invention, a distributed debugger system, which debugs a distributed system which is configured by a program run on plural computers, comprises a program manager for executing a management from a predetermined computer to other computers via a network interconnecting the plural computers, the management being related to the setting status and execution status of a debug object program executed on each of the plural computers.

According to the second aspect of the present invention, in a debugging method, suitable in use for a distributed debugger system that debugs a distributed system configured of a program which runs on plural computers, the method comprises the step of implementing a program management from a predetermined computer to other computers via a network interconnecting the computers, the program management being related to the setting status and execution status of a debug object program to be executed on each of the computers.

Moreover, according to the third aspect of the present invention, in a recording medium, on which a control program for a distributed debugger system for debugging a distributed system constructed by a program which runs on plural computers is recorded, the recording medium records a program management step of executing a management from a specific computer to other computers via a network interconnecting plural computers, the management being related to the setting status and execution status of a debug object program executed on each of the computers.

In the above-described aspects of the present invention, the setting status of the debugger is managed. When the setting status is changed on any one of computers, the change is issued to all remote computers, so that the execution status is shared among the remote computers. Moreover, when the execution status of the debugger is changed on any one of computers, the change is issued to other computers, so that the execution status is shared among the other computers.

BRIEF DESCRIPTION OF THE DRAWINGS

This and other objects, features and advantages of the present invention will become more apparent upon a reading of the following detailed description and drawings, in which:

FIG. 1 is a block diagram illustrating a distributed debugger system according to a first embodiment of the present invention;

FIG. 2 is a block diagram illustrating the specific configuration of the distributed debugger system according to the first embodiment of the invention;

FIG. 3 shows relationships between inputs of the input interpretation function of a user interface and corresponding operations;

FIG. 12 is a block diagram illustrating a distributed debugger system according to a second embodiment of the present invention; and FIG. 13 is a block diagram illustrating a distributed debugger system according to a third embodiment of the present invention.

DESCRIPTION OF THE EMBODIMENTS

Figure 4:
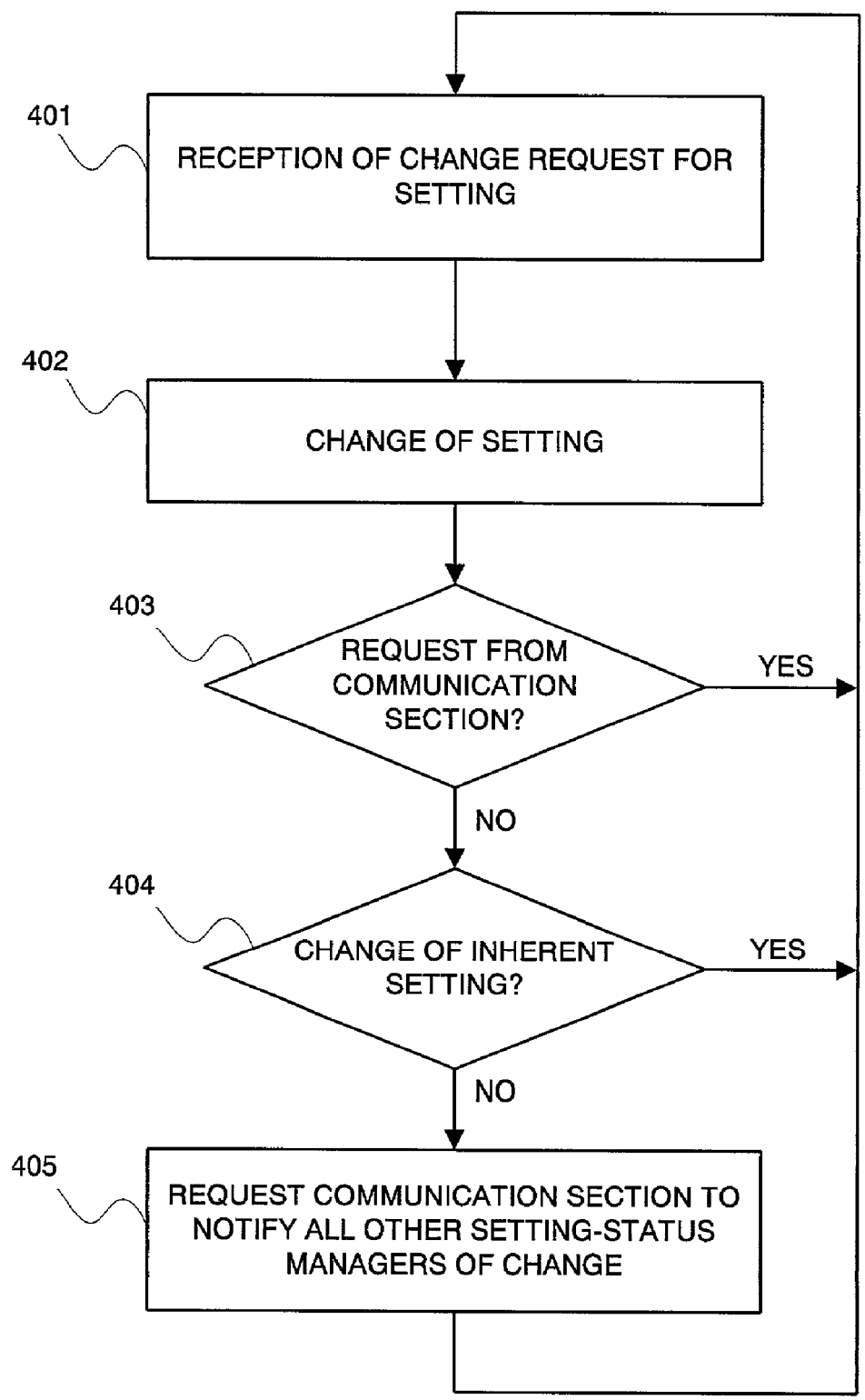
FIG. 4 is a flowchart representing the operation of the setting-status manager 104.

Embodiments according to the present invention will be described below with reference to the attached drawings. FIG. 1 is a block diagram illustrating a distributed debugger system according to the first embodiment of the present invention. Referring to FIG. 1, the debugger system consists of a controller 101 and an executor 102. One or plural controllers 101 and one or plural executors 102 are disposed on a computer and interconnected via a network 130.

The controller 101 is part for implementing the input and output process from a user. The controller 101 is receives and processes instructions to a debugger entered by a user. The controller 101 includes a user interface 103 for displaying an output from a debugger to a user, a setting-status manager 104 for managing the setting of a debugger, an execution-status manager 105 for managing the execution status of a debugger, a communication section 106 for notifying the executor and other controllers of the setting status and the executions status, a communication object manager 107 for managing communication destinations, a place decision section 108 for specifying the existence place of a certain status inside a debug object system, and a remote debugger activator 109 for newly activating the executor on other computer.

The executor 102 manages a debug objected program. The executor 102 includes the setting-status manager 104, the execution-status manager 105, the communication section 106, the communication objected manager 107, and the remote debugger activator 109. The executor 102 further has a process manager 110 that manages the debug objected program 120 and reads out the setting of the break point and the execution status.

The setting-status manager 104 stores the setting status of a debugger into the primary or secondary memory in a computer. The execution-status manager 105 stores the execution status of a debugger into the primary or secondary memory. The communication section 106 is connected to other communication section via the network 130. The communication object manger 107 stores information about the positions of the communication sections in all computers into the primary or secondary memory in each computer.

Next, the operation of the distributed debugger system according to the first embodiment will be explained below with reference to FIG. 1. A user enters debugger processes including the setting of monitoring break points or variables and displaying of the status of variables or stacks, via the user interface 103. The user interface 103 interprets the input status and then instructs the setting status manger 104 to change the setting status when the inputting wants for changing the setting status of a debugger such as the setting of monitoring a break point or variable. Then, the setting-status manager 104 changes the setting status and instructs the communication section 106 to notify the setting-status manager 104 in another computer of the changed content. The communication section 106 makes an inquiry to the communication object manger 107 and acquires sets of information about the positions of all communication destinations. Then, the communication section 106 notifies other communication sections 106 of the changed setting statuses via the network 130. The communication section 106 on other computer, which has received the changed setting status, transfers the same to the setting-status manager 104 to change the setting status.

The process manager 110 manages the execution status of the debug object program 120. The process manager 110 temporarily halts the debug object program 120 when a break point, for example, is detected during the execution of the debug object program while notifying the execution-status manager 105 of the temporal halt of the debug object program. The execution status manger 105 changes the execution status of the debugger and instructs the communication section 106 to inform another computer of the content of the changed status. The communication section 106 inquires the communication object manager 107 and acquires the sets of information about the positions of all communication destinations and then notifies them of the changed execution status via the network 130. The communication section 106 on another computer notifies the execution-status manager 105 of the changed execution status. The execution status manger 105 instructs the process manager 110 to reflect the status, according to the content of the notification, while changing its execution status.

Moreover, the user instructs the user interface 103 to change the execution status. The user interface 103 interprets the instruction. When receiving an instruction to the changed execution status such as temporarily ceasing the debug object program during execution or resuming execution of the debug object program 120 in a temporary halt state, the user interface 103 notifies the execution status manager of it. The execution-status manager 105 instructs the process manager 110 to reflect the status while changing its execution status.

When the debug object program 120 tries to communicate with other computers, the process manager 110 detects the intention and inquires the communication object manger 107 on whether or not the executor 102 has activated on the computer. If not, the process manager 110 instructs a remote debugger activator 109 to activate the executor 102 on the computer. The remote debugger activator 109 newly activates the executor 102 on a specified computer and adds means for establishing communications with the activated executor to the communication object manager 102. Moreover, the remote debugger activator 109 instructs the setting-status manager 104, the execution status manger 105, and the communication object manager 107 to issue the newly-activated executor 102 to the current setting-status, execution-status, communication object list. The newly activated executor 102 receives the list and starts and then starts execution with the same status as those of other executors 102. The information, newly added to the communication object manager 107, is issued to the communication object managers 107 on other computers via the communication section 106.

When a user indicates the user interface 103 to start executing the debug object program 120 on a specific computer, the user interface 130 checks whether or not the executor 102 has been already activated on the computer in response to an inquiry of the communication object manger 107. If the executor 102 is not activated, the user interface 103 instructs the remote debugger activator 109 to activate the executor 102 on the computer.

When the user instructs the user interface 103 to display and change the status of the debug object program 120, the user interface 103 specifies one or plural computers in which the corresponding status exists, using the place decision section 108. Then, the user interface 103 requires the process manager on the computer to acquire the status via the communication section 108. The place decision section 108 conjectures the execution place from the specified content and inquires information about the status existence place of the process manager 110 on the conjectured computer, thus specifying an actual existence place of the status using the information.

Then, the process manager 110 checks for the status of the debug object program 120 and transfers the results to the user interface 103 at the originating source. The user interface 103 processes the results acquired with the output shaping function (to be described later), and then indicates it to the user.

According to the present invention, debuggers in the same setting status manage all debug object programs residing on plural computers. As a result, a change in execution status of each debugger is reflected to the debug object programs on all other computers. For that reason, the user can implement the debugging, without recognizing when the program configuring a distributed system runs or on which computer the program runs. In addition, the status in the distributed system can be displayed and changed while the user does not recognize on which computer the status resides. The debugging can be executed as if the program is running on a single computer.

Next, the configuration and operation of the distributed debugger system according to the first embodiment will be described below in detail. In the present invention, peripheral equipment including a computer operating under program control, input/output equipment such as keyboard, mouse, or display, and a storage section such as memory or hard disk are program controlled generally.

FIG. 2 is a diagram illustrating a specific configuration of the distributed debugger system according to the first embodiment. The distributed debugger system has one controller 101 and one or plural executors 102. The controller 101 includes a user interface 103, a setting-status manager 104, an execution-status manager 105, a communication section 106, a communication object manager 107, and a remote debugger activator 109. The executor 102 includes a setting-status manager 104, an execution-status manager 105, a communication section 106, a communication object manager 107, a remote debugger activator 109, and a process manager 110. The user interface 103 includes an input/output function 131, an input interpretation function 132, and an output shaping function 133. The input and output function 131 is configured of a keyboard or mouse and a display.

The setting-status manager 104 mangers the common setting to all computers and the inherent setting to a specific computer. The common setting has an execution code of a debug object program and a BP table holding information about plural break points, and a variable table holding information about plural monitoring variables. The inherent setting has an inherent BP table holding a break point effective only inside the computer and an inherent variable table holding information about variable monitoring effective only inside the computer.

The execution-status manager 105 manages the common setting to all computers and the inherent setting to a specific computer. The common setting has one of status variables —"in execution of a debugger, "in temporary halt", "in step execution", and "in non execution of program"—. The inherent setting has the process number of a process in execution of a debug object program. The communication object manager 107 has an information table having a combination of a network address of another computer at a communication destination and a port number for connecting with the communication section 106 at the address. The process manager 110 is connected to a debug object program in execution. The remote debugger activator 109 is connected to an external remote program executor 201. The external remote program executor 201 may be rsh of UNIX or the function of the debug object program executor, or a device made for the distributed debugger only.

Next, the operation of the distributed debugger system will be explained here. FIG. 3 is a diagram illustrating the inputting of the input interpretation function and the corresponding operation of the user interface. The input interpretation function 132 of the user interface 103 interprets the inputting from the user, as shown in FIG. 3. When accepting "specification of debug object program", "addition of break point", "deletion of break point", "addition of variable monitoring", or "deletion of variable monitoring", the input interpretation function 132 notifies the setting-status manager 104 of it. When accepting "beginning of execution", "temporary halt of execution", "end of execution", or "step execution", the input interpretation function notifies the execution-status manager 105 of it. When accepting "display of stack status", or "display of variable status", the input interpretation function 132 specifies one or plural computers in which the status exists, using the place decision section 108 and issues a status inquiry request to the process manager 110 thereof. Moreover, the input interpretation function 132 notifies the output shaping function 133 of the type of requested status or the number of requested statuses.

The output shaping function 133 in the user interface 103 displays the output from the process manager 110. Particularly, when the input interpretation function 132 issues the type or number of statuses to be displayed, the output shaping function 133 sums up sets of information from plural process managers 110 based on the information or collects and analyzes them, finally displaying them to the user.

FIG. 4 is a flowchart indicating the operation of the setting-status manager 104. The setting-status manager 104 receives a setting change request in the step 401 and reflects it to the status in the step 402 and checks whether or not the request has been sent from another computer via the communication section 106 in the step 403. If not, the setting-status manager 104 checks whether or not the request relates to a change of the inherent setting in the step 404. If not, the status is issued to the setting-status mangers 104 in all other computers via the communication section 106. When it is judged that a change request or a change request for an inherent setting has come from another computer via the communication section 106 in the steps 403 and 404, the status is merely changed but is not issued to other computers.

Figure 5:
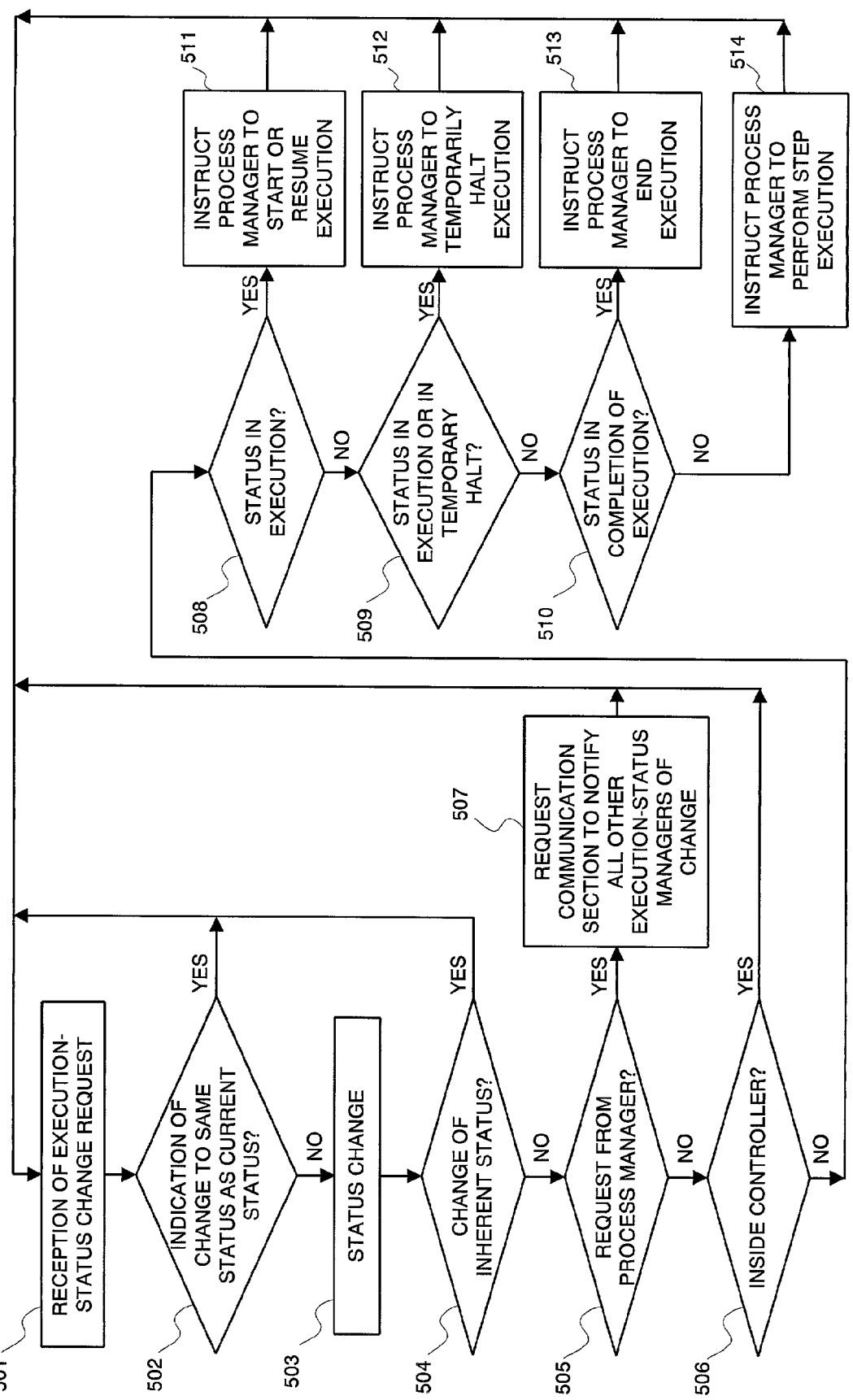
FIG. 5 is a flowchart representing the operation of the execution-status manager 105.

FIG. 5 is a flowchart representing the operation of the execution-status manager 105. The execution-status manager 105 receives an executions status change request in the step 501. The execution-status manager 105 first checks whether or not the change request corresponds to a change request for the same status as the current status in the step 502. If the the status is the same as the current status, it is ignored. When the status differs from the current status, the change is reflected to the status in the step 503. Whether or not the request corresponds to an inherent status change is checked in the step 504. If the request is for an inherent status change, nothing is processed in the following steps. When the request is for a common status change, it is verified in the step 505 whether or not the process manager has sent the change request. When the change request is one sent from the process manager, the changed content is issued to all other execution-status managers 105 connected via the communication section 106 in the step 507.

When the request is not one sent from the process manager 110 but is within the executor, not the controller, in the step 507, the execution-status manager 105 instructs the process manager to execute the process according to the changed content of the status.

Specifically, when the status becomes "in execution" in the step 508, the execution-status manager 105 instructs the process manager to begin or resume the execution in the step 511. When status becomes "temporary halt of execution" in the step 509, the execution-status manager 105 instructs the process manager to temporarily halt the execution in the step 512. When the status becomes "end of execution" occurs in the step 510, the execution-status manager 105 instructs the process manager to halt the execution in the step 513. When the status becomes "step execution, the execution-status manager 105 instructs the process manager 110 to perform the step execution in the step 514.

The communication section 106 accepts a communication request from other sections and issues messages to all communication destinations or part thereof associated with the communication object manger 107, according to the content of the communication request. The communication section 106 receives a message from other communication section 106 and invokes other sections within the computer according to the content of the message.

The communication object manager 107 tells information about all or part of possessed communication destinations according to inquiries from the communication section 106.

With the instruction from the remote debugger activator 109, the communication object manager 107 adds information about a newly-activated communication destination and then issues it to the communication object managers 107 on other computers via the communication section.

The process manager 110 implements the beginning of execution, ending, temporary halt, and step execution of the debug object program 120, based on instructions from the input interpretation function in the user interface 103 or the execution-status manager 105. The process manager 110 starts the execution of the debug object program 120, based on information about break points or variable monitoring recorded in the setting-status manager 104. When a break point is detected, the process manager 110 temporarily halts the debug object program 120 and notifies the execution-status manager 105 of a change to the status temporary halt. When a change of a monitored variable is detected, the process manager 110 notifies the output shaping function in the user interface 103 to display the occurrence of the changed variable via the communication section 106.

When a status capture request has come from the input interpretation function in the user interface 103 via the communication section 106, with the debug object program in a temporary halt state, the process manager 110 checks the status corresponding to the debug object program in a temporary halt state. Thus, the process manager 105 informs the user interface 103 at the communication destination of the result via the communication section 106. When a status capture request comes from the place decision section 108 via the communication section 106, the process manager 105 informs the place decision section 108 at the communication destination of the result via the communication section 106.

Figure 6:
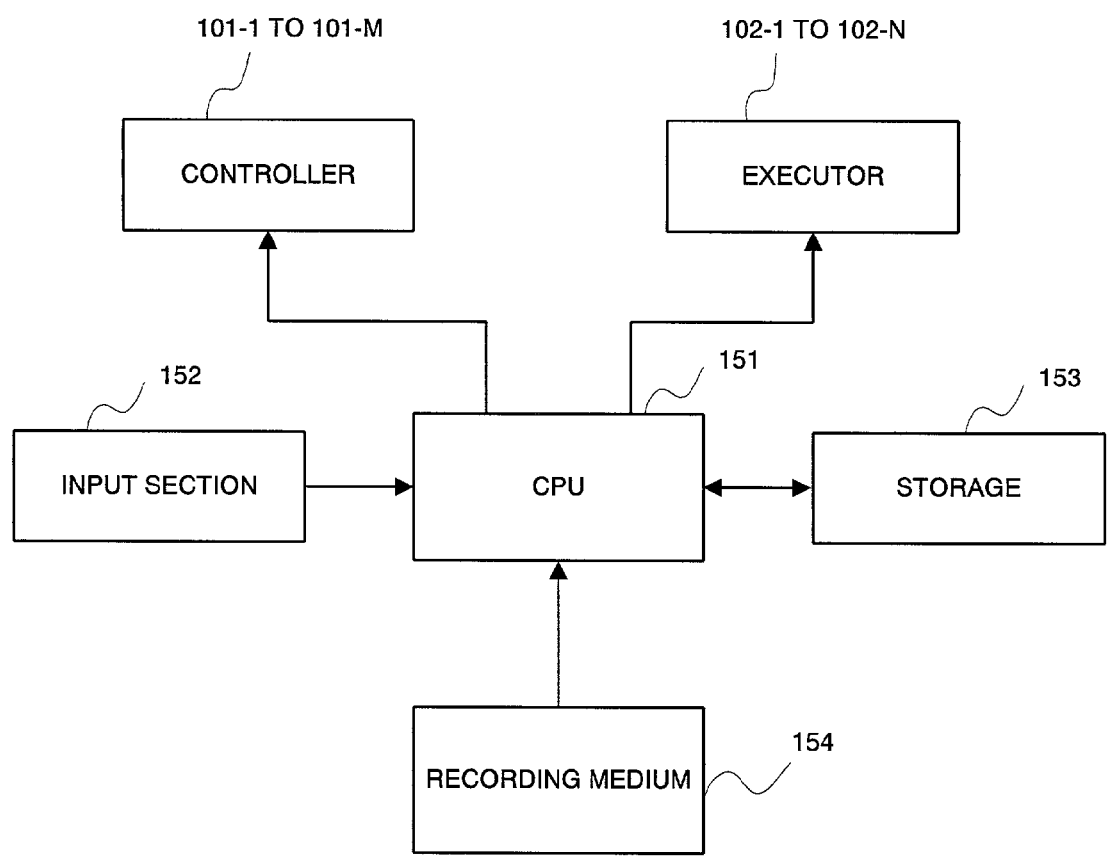
FIG. 6 is a block diagram illustrating a recording medium driver.

Next, the operation of the distributed debugger system according to the second embodiment will be explained below. The second embodiment relates to a recording medium and a recording medium driver, on which the control program for the distributed debugger system is recorded. FIG. 6 is a block diagram illustrating a recording medium driver. Referring to FIG. 6, the recording medium driver consists of a CPU (Central Processing Unit) 151, an input section 152 and a storage section 153. The CPU 151 controls the controllers 101-1 to 101-M (where M is a positive integer) and executors 102-1 to 102-N (where N is a positive integer). The recording medium driver drives the recording medium 154. The recording medium 154 previously saves a control program for the debugger system shown with the flowcharts in FIGS. 4 and 5.

Next, the operation of the recording medium driver will be explained. When receiving a program load instruction via the input section 152, the CPU 151 first reads in the program from the recording medium 154 and writes it into the storage section 153. Next, when receiving the program execution instruction via the input section 152, the CPU 151 reads in the program from the storage section 153 and controls the controllers 101-1 to 101-M and the executors 102-1 to 102-N according to the loaded program. The control content has been already described and hence the duplicate explanation will be omitted here.

Figure 7:
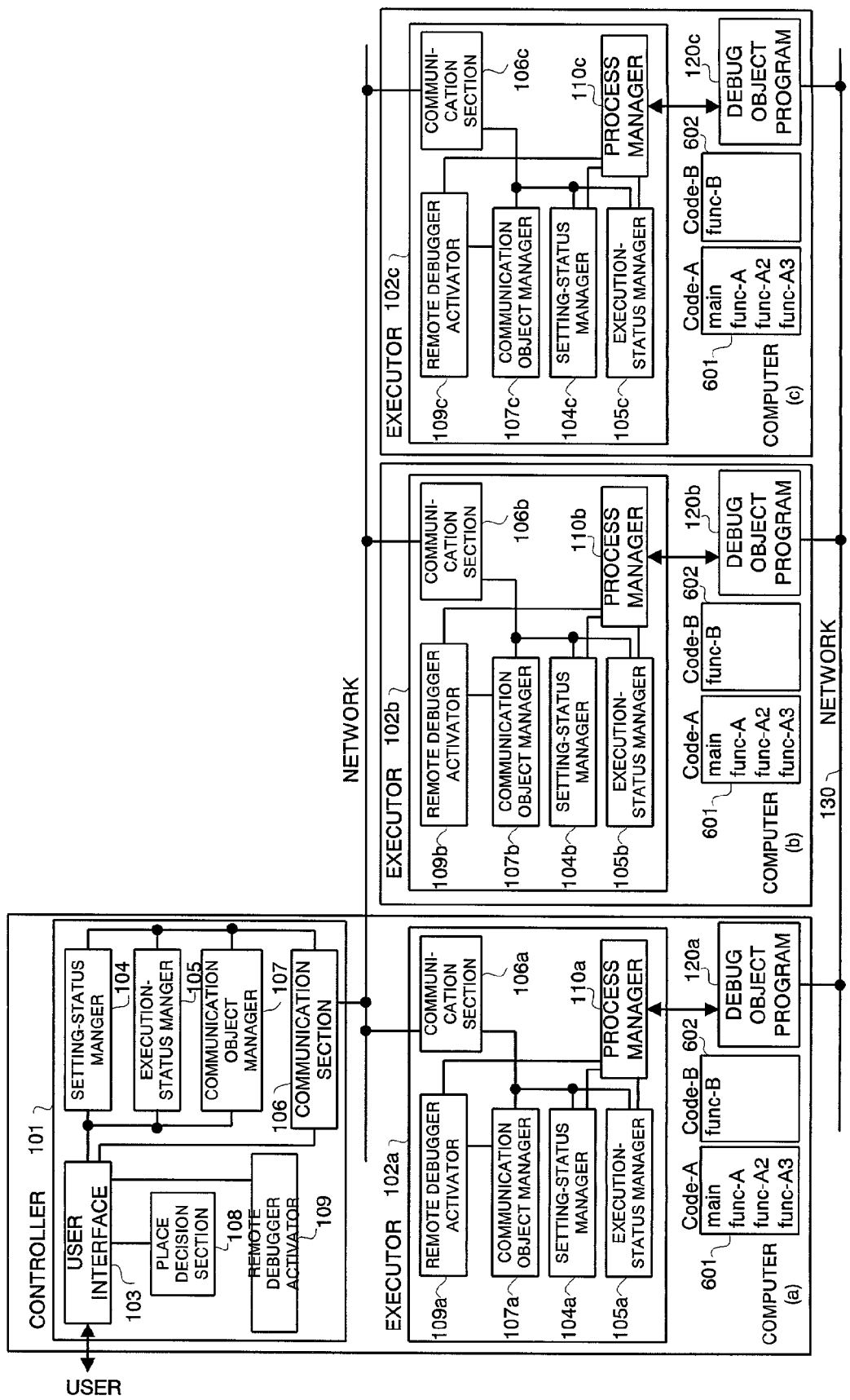
FIG. 7 is a block diagram illustrating the distributed debugger system according to the first embodiment.

Embodiments:

Next, the distributed debugger system according to embodiments of the present invention will be explained below. The first embodiment will be first explained here. FIG. 7 is a block diagram illustrating the distributed debugger system according to the first embodiment. The case where the distributed system which includes three computers (including computers (a), (b) and (c)) interconnected via the network 130 and executes the program execution codes code-A601 and code-B602 on the three computer, is debugged by the distributed debugger system of the present invention will be explained as an example by referring to FIG. 7.

Figure 8:
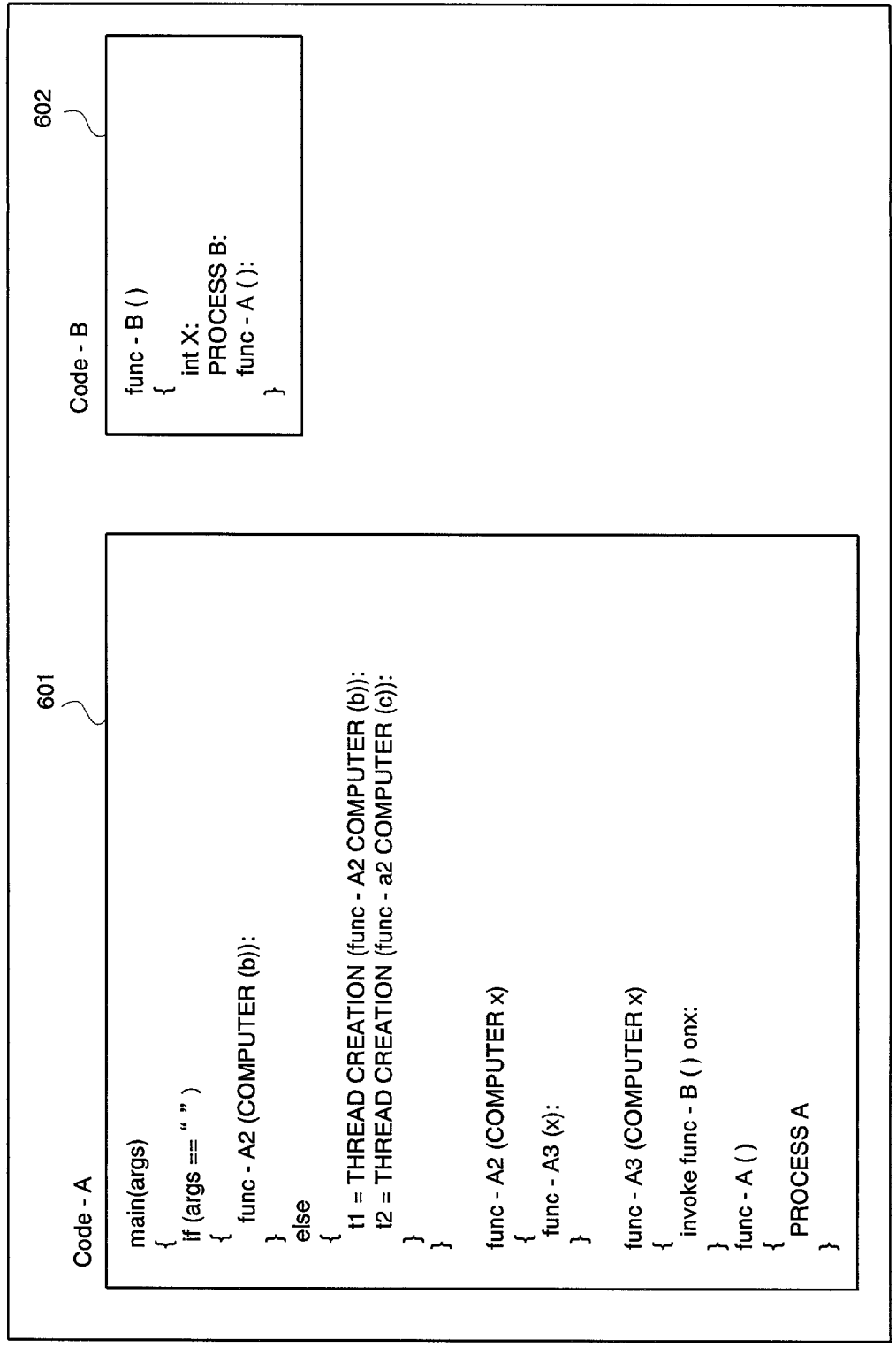
FIG. 8 is a diagram describing the content of the code-A 601 and the content of the code-B 602.

FIG. 8 is a diagram illustrating the content of code-A601 and the content of code-B602. Code A-601 has four function definitions—main, func-A, func-A2, and func-A3—. The function "main" being a program activation function takes the argument "args" at activation time. If any argument is not specified at activation time, the argument computer (b) calls up func-A2 and operates on a single thread. If an argument is given, two threads including the thread executing func-A2 by the argument computer (b) and the thread executing func-A2 by the argument computer (c) are created. The created two threads operate in parallel. The function func-A2 takes an argument "x". The function func-A3 is called up with the argument "x". The function func-A3 takes an argument "x". The function func-B is called up with the argument "x" acting as the function execution place.

At this time, the function func-B starts execution on the computer specified with "x", not on the computer executing func-A3. When the execution ends, the computer again continues to execute the func-A3. The function func-A executes a given process "process A". code-B602 has one function definition "func-B". The function func-B has an int-type variable X. After a given process "process B" is executed, the function func-A is called up. Unless specified, the invoked function is executed with the same computer as that for the invoking function.

(Activation) It is now assumed that the controllers 101 and the executors 102a, 102b and 102c are in a non-activation state. The user specifies the file name of the execution code code-A601 of the debug object program and then activates the controller 101 of the distributed debugger system. At an activation state, the status of the variable of the execution-status manager 105 is initialized to "program non-execution status" and the communication object manager 107 is initialized to have its network address and its port number thereof. After the input interpretation function of the controller 101 records the file name of a specified execution code code-A into the setting-status manager 104, the remote debugger activator 109 activates the executor 102a in the same computer. The status common setting, the shared execution status and the communication destination table, which are respectively managed by the setting-status manager 104, the execution-status manager 105 and the communication object manager 107, are transferred to the executor 102a via the communication section 106. Then, the executor 102a activated receives those contents via the communication section 106a and reflects them to management of the setting-status manger 104a, the execution-status manager 105a, and the communication object manager 107a.

When the user sets a break point to the function func-A in code-A601 via the user interface 103, the input interpretation function of the user interface 103 instructs the setting-status manager 104 to add the break point.

The setting-status manager 104 manages the common setting to all computers and the inherent setting to a specific computer. The common setting has an execution code of a debug object program and a BP table holding information about plural break points, and a variable table holding information about plural monitoring variables. The inherent setting has an inherent BP table holding a break point effective only inside the computer and an inherent variable table holding information about variable monitoring effective only inside the computer.

When a user instructs the execution-status manager 105a to start the execution of the debug object program via the user interface 103, the execution interpretation function of the user interface 103 changes the status of the execution status 105 to "in execution". The execution-status manager 105 responds the change and instructs the execution-status manager 105a in the executor 102a to change the status to "in execution" via the communication section 106. Then, the execution-status manager 105a sets the execution status to "in execution" and instructs the process manager 110a to start the execution of the debug object program. The process manager 110a starts execution of the execution code "code-A" as a debug object program 120a recorded in the setting-status manager 104a. The process ID of the debug object program 120a of which the execution is started is saved to the process number of the execution-status manager 105a. The process number, being an inherent status, is not transferred to other computers.

(Remote Function Call Debugging in the Case of a Simple Thread)

It is now assumed that when a user activates code-A without an argument, the debug object program 120a, which starts execution from the main function in code-A, sequentially invokes func-A2 and func-A3 among main functions and accomplishes communications with the computer (b) and executes func-B in code B on the computer (b). In such a case, the process manager 110a detects the above execution and checks whether or not the computer (b) is registered in the communication object manager 107a. If not, the process manager 110a instructs the remote debugger activator 109a to activate the executor of the computer (b). The remote debugger activator 109a newly activates the executor 102b on the computer (b) and instructs the setting-status manager 104a, the execution-status manager 105a and the communication object manager 107a to inform the activated executor 102b of the status. After receiving the setting status, the execution status and the communication destination information, the executor 102b of the activated computer (b) is connected to the debug object program 120b which has accepted communications from the computer (a) on the computer (b). Thus, the executor 102b saves the process ID to the process number of the execution-status manager 105b and the starts debugging.

When func-B calls up func-A in code-A on the computer (b), the process manager 110b of the executor 102b on the computer (b) detects the break point set to func-A and temporarily halts the debug object program 120b. The process manager 110b also issues a change to temporary halt of the status of the execution-status manager 105b. The execution-status manager 105b sets its status to "in temporary halt" and instructs the communication section 106b to issue a change of the execution status. The communication section 106b acquires information about communication destinations of the controller 101 and the executor 102a from the communication object manager 107b and informs them of a change to "in temporary halt" of the execution statuses. The communication section 106 in the controller 101 transmits the notification content or the exchange status change to the execution-status manager 105 while and the communication section 106a in the executor 102a transmits the notification content or the execution status change to the execution-status manager 105. Each of the execution-status managers 105 and 105a sets its status to "in temporary halt". The execution-status manager 105a in the executor 102a instructs the process manager 110a to temporarily halt the execution thereof. In reception to the temporary halt, the process manager 110a temporarily halts the execution of the debug object program 120a on the computer (a).

While the debug object programs 120a and 120b are in a temporary halt state, the user can instruct the user interface 103 to display the execution stack of functions or internal data structure in each of the debug object program 120a and 120b.

Figure 9:
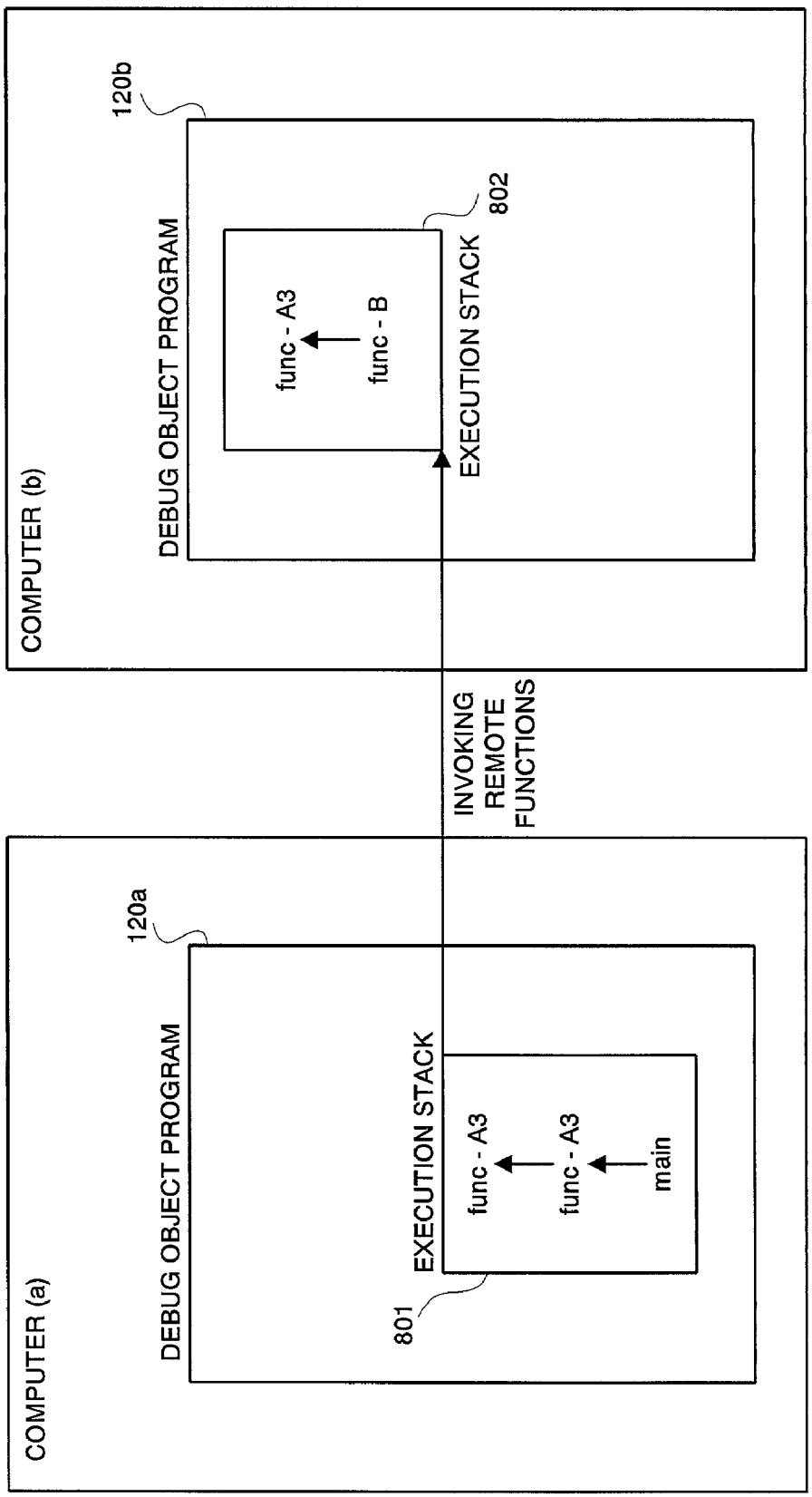
FIG. 9 is a diagram illustrating the execution stack of the debug object program 120a and the execution stack of the debug object program 120b, each being in a halt state at a break point set to func-A.

FIG. 9 is a structural diagram illustrating an execution stack of the debug object program 120a and an execution stack of the debug object program 120b in a halt state at a break point set to func-A. The execution stack of a thread of which execution is started from the function "main" resides on the upper portion 801 on the computer (a) and the portion 802 on the computer (b), separately.

When the user issues an instruction to display the execution stack, the input interpretation function of the user interface 103 inquiries the existence place of the execution stack of the place decision section 108. Since the execution certainly starts from the place where the execution object program was first activated, the place decision section 108 conjectures that the execution stack exists in the place or the executor on the computer (a). Thus, the place decision section 108 inquires the status of the execution stack from the process manager 120a in the executor 102a on the computer (a). As a result, the place decision section 108 acquires information that the debug object program 102a on the computer (a) is calling func-B from func-A2 and thus conjectures that the execution stack exists in the computer (b). Next, the place decision section 108 inquires the state of the execution stack of the process manager 110b on the computer (b). As a result, the place decision section 108 acquires information that the debug object program on the computer (b) is in a temporary halt state at the break point. Finally, the place decision section 108 specifies that the execution stack resides on the computers (a) and (b), thus returning the result to input interpretation function. Based on the result, the input interpretation function transmits the status capture request to the process manager 110a in the computer (a) and the process manager 110b in the computer (b). Meanwhile, the input interpretation function notifies the output shaping function of the user interface 103 that information about execution stack information has been requested to the computers (a) and (b). As a result, the process manager 110a of the computer (a) transmits the status of the execution stack 801, that is, the detail execution status of functions, main, func-A2, and func-A3, to the output shaping function of the user interface 103 via the communication section 106. The process manager 110b of the computer (b) transmits the status of the execution stack 802, that is, the detail execution status of functions, func-B and func-A, to the output shaping function of the user interface 103 via the communication section 106. The output shaping function receives information from the input interpretation function in the user interface 103, the process manager 110a in the computer (a), and the process manager 110b in the computer (b) and sums up them. Then, the output shaping function indicates that the execution stack is calling the function in the form of main, func-A2, func-A3, func-B, and func-A.

Figure 10:
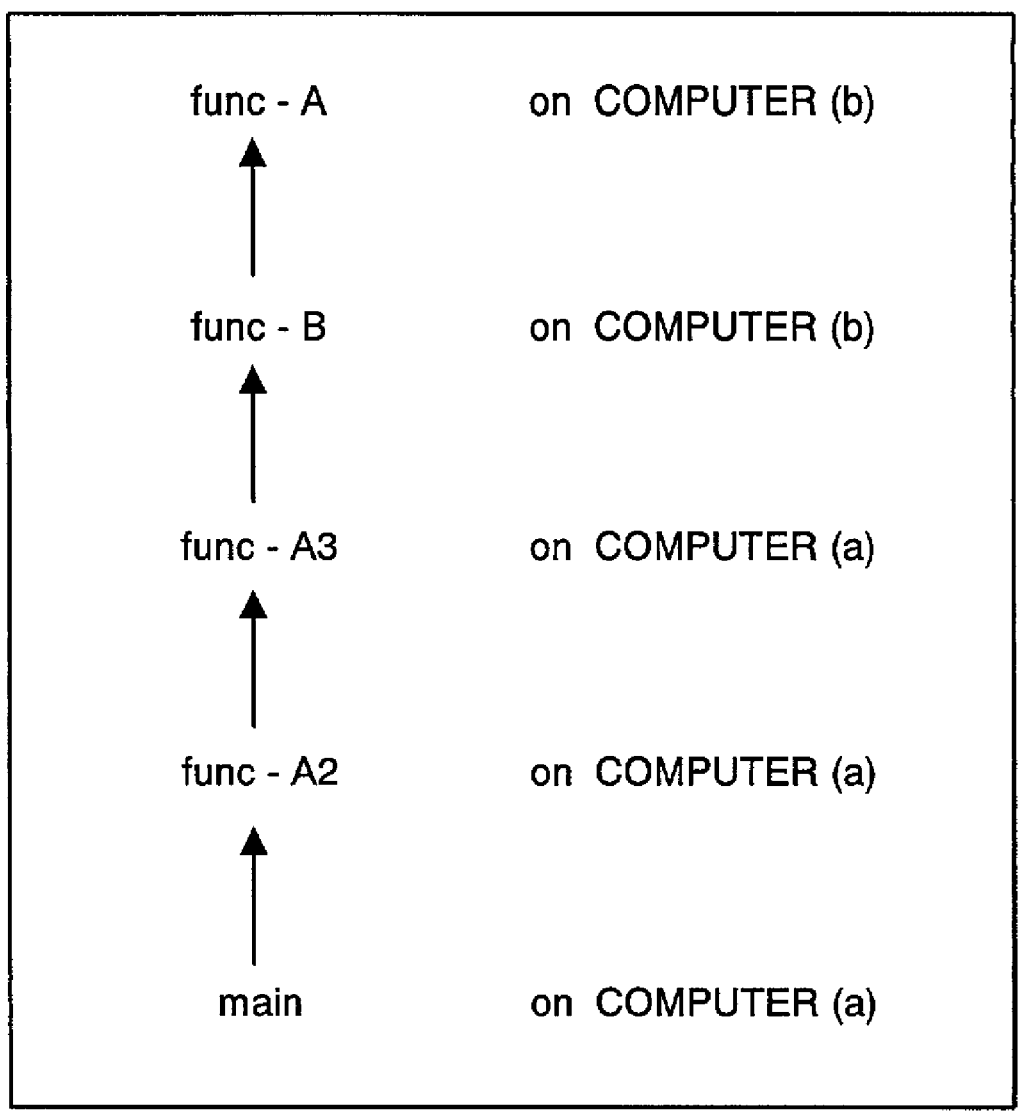
FIG. 10 depicts a display image of an execution stack by the output shaping function of the user interface 103.

FIG. 10 is a diagram illustrating a display image of an execution stack by means of the output shaping function in the user interface 103. When the user further issues displaying the variable x of function, func-B, the input interpretation function of the user interface 103 inquiries the place of func-B of the place decision section 108 and acquires the fact that the execution stack of func-B resides on the computer (b). Then, the input interpretation function requires the variable value of func-B from the process manager 110b on the computer (b).

When the user instructs the beginning of execution, the user interface 103 instructs the execution-status manager 105 to change the status to "in execution". The input interpretation function 105 changes the status and informs the execution-status manager 105a in the computer (a) and the execution-status manager 105b in the computer (b) of the change via the communication section 106. Each of the execution-status managers 105a and 105b changes the status in response to the change. The execution-status manager 105a instructs the process manager 110a to resume the execution while the execution-status manager 105b instructs the process manager 110b to resume the execution. In response to the instruction, the process manager 110a resumes the execution of the debug object program 120a while the process manager 110b resumes the execution of the debug object program 120b.

(Remote Call Debugging in the Case of a Multithread)

When the function "main" of code-A601 is activated by providing a suitable argument, the debug object program 601 creates two threads immediately after its activation. The two threads are operated in parallel such that one thread executes func-B on the computer (b) and the other thread executes func-B on the computer (c).

Figure 11:
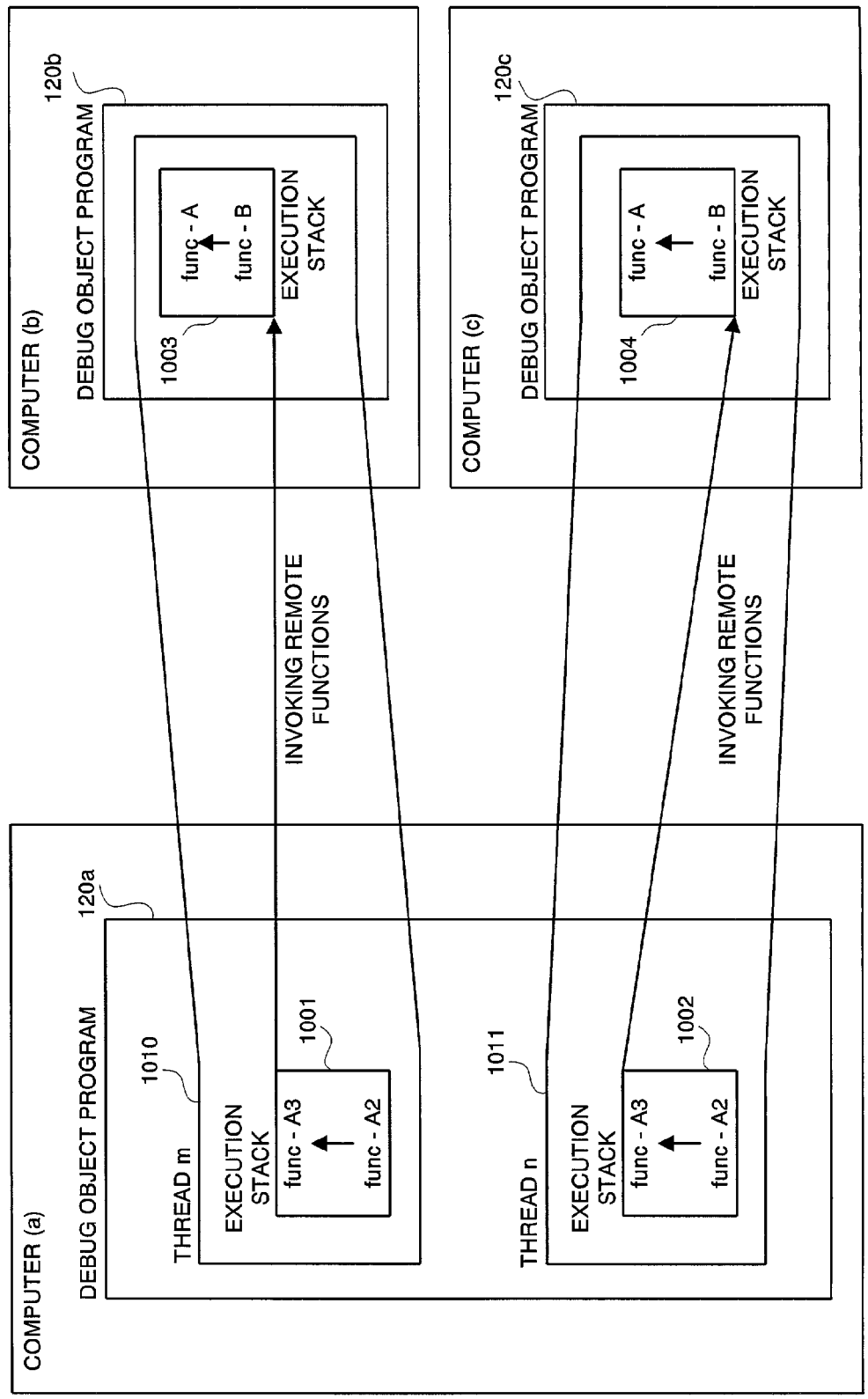
FIG. 11 depicts two threads with which a debug object program operates, each calling for func-A.

FIG. 11 is a thread structural diagram illustrating that a debug object program runs with two threads and that each thread is calling func-A. The debug object program is separated into three portions 120a, 120b and 120c, each including two threads —m1010 and n1011—.

The thread m1010 is separated into two execution stacks 1001 and 1003. The thread n1011 is separated into two execution stacks 1002 and 1004. In parallel operation, the thread m1010 is executing func-A on the computer (b) while the thread n1011 executing func-A on the computer (c). In this case, when the user sets a break point to the function, func-A, each executor is activated in a similar manner to that in the operation of a single thread. That is, when the thread m1010 communicates with the computer (b), the executor 102b is activated on the computer (b). When the thread n1011 communicates with the computer (c), the executor 102c is activated on the computer (c).

The thread m1010 or thread n1011 may invoke the function "func-A". Since those two threads operate in parallel, it cannot be previously conjectured whether or not either of them invokes func-A in advance or both invoke func-A at the same time. If the thread m1010 calls up func-A in advance of the thread n1011, the process manager 110b of the computer (b) detects the break point, in a manner similar to that in the single thread, and then ceases the debug object program 120b. Then, the process manager 110b notifies the execution-status manager 105b of a status change to a temporary halt. The execution-status manager 105b changes the status and then informs other execution-status managers 105, 105a and 105c of the change. The execution-status manager 105c of the computer (c) instructs the process manager 110c to temporarily halt the execution. The process manager 110c temporarily stops the thread n1011 which is executing the function "func-B" inside the debug object program 120c. During the temporary halt, the user can simultaneously check the status of the thread n1011 executing the function on the computer (c) or the execution status of the debug object program 120c on the computer (c), in addition to the status of the thread m1010 on the computer (b) which has detected the break point.

Both calling func-A on the computer (b) by the thread m1010 and calling func-B on the computer (c) by the thread n1011 may occur at the same time. In such a case, the process manager 110b of the computer (b) informs the execution-status manager 105b of a change to a status temporary halt, like the operation of a single thread. Meanwhile, the process manager 110c of the computer (c) informs the execution-status manager 105c of a change to a status temporary halt. Each of the execution-status managers 105b and 105c changes the status. The execution-status manager 105b informs the execution-status managers 105 and 105a and 105c of the status change. The execution-status manager 105c informs the execution-status managers 105, 105a and 105b of the status change. In this case, each of the execution-status managers 105 and 105a receives two same notifications on the status change. Each of the execution-status managers 105b and 105c receives the notification on the status change after the temporary halt state but ignores it by recognizing as a preset state because the execution status is in a temporary halt.

Next, the distributed debugger according to the second embodiment of the present invention will be explained below. In the first embodiment, the executor and the controller are realized as different components in the same computer. However, since the executor and the controller have functions overlapped with each other, it is reasonable to integrate them as one component.

FIG. 12 is a block diagram illustrating the distributed debugger system according to the second embodiment. Referring to FIG. 12, the executor and controller are integrated as a control and execution section 1101. The control and execution section includes a user interface 103, a setting-status manager 104, an execution-status manager 105, a communication section 106, a communication object manager 107, a place decision section 108, a remote debugger activator 109, and a process manager 110. Communications between the input interpretation function and the process manager within the same control and execution section can be accomplished via no communication section.

Next, the distributed debugger system in the third embodiment will be explained here. In the first embodiment, the debug object program is connected to the distributed debugger system via the process manager and is basically realized as an independent program. The debug object program and the distributed debugger system may be realized on the same distributed system construction foundation.

FIG. 13 is a block diagram illustrating the distributed debugger system according to the third embodiment. Referring to FIG. 13, the distributed debugger system and the debug object program are realized on the same distributed debugger construction foundation. The communication section and the remote debugger activator in the distributed debugger system utilize the communication mechanism provided by the distributed debugger construction foundation. Realizing the distributed debugger system itself on the distributed debugger construction foundation 161 allows the distributed debugger system to be easily assembled.

In the first and second embodiments, the place where the execution of the debug object program is started is handled as the executor belonging to the computer which includes the controller. However, it is effective that the user can arbitrarily specify the executor when an operation place at the time of debugging is to be separated from an execution place of the object program. In this case, the input interpretation function receives an execution place specification from a user, an executor is created on a specified computer. Then, it is preferable that the executor starts the execution of the debug object program.

In the first and second embodiments, typical functions of the debugger which operates on the existing single computer, such as monitoring break points and variables and displaying stacks and variables, have been explained as an example. However, objects to which the present invention is applied are not limited to only those embodiments. Sharing many settings and execution statuses of the debugger including various program execution-status monitoring functions, a program temporary halt instructed from a user, definition of debugging commands by a user, and others improves the serviceability of the distributed debug system.

Moreover, in the first and second embodiments, communications between computers has been explained with the example of the function remote activation. However, the present invention is applicable even to other communication systems. Particularly, it is very effective to apply the present invention to the communication system for agent transfer, object transfer, and the like. When the present invention is applied to the debugging of an agent transfer system, this approach detects a transfer of an agent, acquires information about the computer at the transferred destination, and activates the executor therein. Thus, the setting of the same break point can be used at an agent transfer destination. In order to debug the agent transfer system that one program settles down on a large number of computers and various places of a program code are executed on each computer, it is very useful that the setting of one break point is validated on all computers.

Part of functions provided by the present invention may be assembled in embodiment. For example, the function of the place decision section is unnecessary in constructing the debugger that a user can always specify explicitly the existence place of information.

Where information sent from each process management function is separately displayed on the window of each of computers, without particularly processing, the output shaping function of the user interface may be omitted.

Moreover, in the first, second and third embodiments, when the debug object program communicates with a computer, not known by the communication object manager, the executor is newly activated on the objective computer. However, it may be possible that each computer previously activates the executor and the debug object program is connected to the executor in an activated state, without newly activating the executor, when communicating with a computer not known by the communication object manager. Moreover, the executors may be disposed to specific computers only, without preparing the executor in all computers which communicate with the debug object program. Thus, it may be possible that only the operations on the computers in which the executors exist are debugged and communications with computers other than the specific computers is not debugged.

In the foregoing embodiments, the distributed debugger system includes a single controller and plural executors. However, plural controllers may be used. When plural controllers are used, information sets about the plural controllers may be merely registered in the communication object manager. This configuration allows plural users to perform debugging at the same time.

In the first aspect of the present invention, a distributed debugger system debugs a distributed system which is constructed by the program which operates on plural computers. The distributed debugger system includes a program manager that executes a management of the setting status and execution status of a debug object program executed on each of computers from a predetermined computer to other computers via the network interconnecting the computers. The present invention can provide a debug environment with higher distributed transparency to the programmer and can more easily facilitate the debugging of the distributed system. Particularly, the distributed debugging environment can be provided where the setting status and execution status of a debug object program are managed as if a program which operates on a single computer is executed and debugged on a single computer, without making the programmer recognize distribution to plural computers.

That is, the setting status is shared in common by managing the setting status of the debugger is managed and issuing the change to all remote computers when the setting status is changed on a computer. When the execution status of the debugger is changed on a computer, the change is issued to other computers, so that the execution status is shared in common.

According to the second aspect of the invention, the debugging method is suitable to a distributed debugger system that debugs a distributed system which is constructed by the program which operates on plural computers. The distributed debugger system includes the program management step of executing a management of the setting status and the execution status of a debug object program which runs on each of computers from a predetermined computer to other computers via the network interconnecting the computers. This method has the same advantage as that in the first aspect of the invention.

Moreover, according to the third aspect of the invention, a recording medium records a control program adaptable for a distributed debugger system that debugs a distributed system constructed by the program which operates on plural computers. The recording medium records the program management step of executing a management of the setting status and the execution status of a debug object program which runs on each of computers from a predetermined computer to other computers via the network interconnecting the computers. This recording medium has the same advantage as that in the first aspect of the invention.

In more detailed explanation, the same setting for debugging is applicable to the operation on plural computers in the distributed system to be debugged. The setting such as a break point, which is once set, is saved in the setting-status manager. Even if the debugger is newly activated on a remote computer after the setting, the content of the setting is automatically issued so that the user does not need to reset the content. Even if the setting is changed, the changed content is always issued to the setting-status managers on other computers so that the debugger can be operated on all computers based on the same setting.

If the present invention is not embodied in the distributed debugger system, the user must set the setting to debuggers on all computers every time the debugger is newly activated on a remote computer or the setting is changed. As a result, the serviceability to users degrades. If the user forgets the resetting, the debugging is differently reset to the computers, so that the operation may not stop at the place where the operation must originally halt temporarily. The problem occurs that the user may misunderstand the execution status of the debug object program.

Regarding the second advantage, when a certain debugger among debuggers which operate on plural computers changes its status such as temporary halt or execution halt, the change is correctly conveyed to the debuggers on other computers, so that the same status is maintained. When part of distributed debugger systems changes its execution status due to break point detection or interrupt by a user, the execution-status manager automatically informs the other part of the distributed debuggers of the change. In addition, since an operation change is instructed to the process manager according to the changed content, the same execution status can be maintained on all computers.

If the distributed debugger system is realized without embodying the present invention, the user must manually change the status of other debuggers when the execution status of part of debuggers which operates on plural computers changes, so that the serviceability to users degrades. When the user does not immediately change the status of other portions, the execution of other portions continues while part of distributed system to be debugged is temporarily halted, so that the internal status may be largely changed. This makes it very difficult for the user to grasp the execution status of a debug object program.

Regarding another advantage, when the user displays the execution status of the distributed system, it is not required that the user recognizes what computer the status exists in. The user interface specifies one or plural places where a status exists by means of the place decision section and informs the process manager at the place of the status and then sums up and shapes the acquired results. For that reason, the user can grasp the status of the debug object system, without being conscious of the distribution to plural computers in a debug object system.

If a distributed debugger is realized without utilizing the present invention, the user must previously know what computer the status exists in to grasp the status of the object system. This largely deteriorates the advantage that realization of the distributed transparency of the distributed system construction foundation facilitates the system configuration.

According to the present invention, in order to realize the distributed debugger system, independent debuggers each which operates on different computers are apparently combined and the internal status is related to the debugging. Thus, the whole consistency can be maintained. This allows the user to provide a consistent debugging environment independently of computers. Thus, debugging which does not lose the distributed transparency provided by the distributed system construction foundation can be provided.

The entire disclosure of Japanese Patent Application No. 11-355386 filed on Dec. 15, 1999 including specification, claims, drawing and summary are incorporated herein by reference in its entirety.

What is claimed is:

1. A distributed debugger system, which debugs a distributed system which is configured by a program run on plural computers, comprising:

a program manager for executing a management from a predetermined computer to other computers via a network interconnecting said plural computers, said management being related to the setting status and execution status of a debug object program executed on each of said plural computers, wherein said program manager comprises:

at least one of controllers for receiving instructions from a user;

at least one of executors connected to said debug object program;

each of said controllers including a setting-status manager for managing the setting of each of debuggers constructing said distributed debugger system and communication means for communicating with other of said controllers or said executors;

each of said executors including a setting-status manager for managing the setting of each of debuggers constructing said distributed debugger system and communication means for communicating with other of said controllers or said executors;

said setting-status manager changing its setting content when a change in setting is instructed, and then notifying a setting-status manager in other of said controllers or said executors of the changed content using said communication means, while said setting-status manager changes its setting content in response to notification, said setting-status manager notifying a debugger on another of said computers to change an execution status via data sent by way of said communications means over said network, when a status change is instructed due to a change of management of the debug object program at said computer in which said setting-status manager operates on, wherein said distributed system to be debugged is debugged using the same setting on all computers in which said distributed debugger operates, each of said controllers including an execution-status manager for managing an execution status of each of debuggers constructing said distributed debugger system;

each of said executors including said execution-status manager for managing the execution status of said debugger, and a process manager for managing a debug object program;

wherein said execution-status manager changes its setting content when being instructed to change the execution status; said communication means notifies said execution-status manager in other of said controllers or said execution-status manager of the changed content upon occurrence of a temporary halt status due to detecting of a breakpoint; and said execution-status manager changes its status in response to the notification and instructs said process manager to instruct a change of operation; wherein the same execution status is maintained on all computers on which said distributed debugger system operates.

2. The distributed debugger defined in claim 1, wherein each of said controllers including a user interface for interpreting a request for displaying the status of a debug object program from a user and displaying the results, and place decision means for specifying one or more existence places in the status specified based on the nature of the status when the status of a debug object program is specified and based on the execution status of a debug object program acquired from said process manager;

each of executors including a process manager for managing a debug object program;

said user interface inquiring said place decision means in response to a request for displaying the status of a debug object program from a user and then acquiring one or more existence places of the status and transmitting a status capture request to said process managers at all existence places via said communication means;

said process manager checking the execution status of a debug object program under management in response to a status capture request and transmitting results to said user interface at the request source;

said user interface receiving one or more results and then outputting said results in a batch mode to said user, wherein said user acquires the status of a distributed system to be objected, without recognizing its existence place.

3. The distributed debugger system defined in claim 1, wherein said program manager and said debug object manager are realized on the same distributed system construction foundation and wherein said program manager uses a communication function provided by said distributed system construction foundation.

4. The distributed debugger system defined in claim 1, wherein said program manager comprises:

said setting-status manager for holding as a setting status a debug object program activation method;

a remote debugger activator for activating said executor on a remote computer; and a user interface for interpreting a debug object program from a user and a specification of an execution start place thereof;

said user interface receiving a specification of said debug object program from said user and then notifying said setting-status manager of the specification;

said user interface receiving the specification of said execution start place of said debug object program from said user and instructing said executor specified by said remote debugger activator to activate said executor;

said remote debugger activator activating said executor on a specified computer;

said user interface instructs said activated executor to start the execution of said debug object program;

said process manager in said executor instructed acquiring information about a debug object program held in said setting-status manager to start execution of said debug object program;

wherein execution of a debug object program is started on a computer different from the computer operated by said user.

5. The distributed debugger system defined in claim 1, wherein said program manager and said debug object manager are realized on the same distributed system construction foundation and wherein program manager uses a communication function provided by said distributed system construction foundation.

6. The distributed debugger system defined in claim 1, wherein said program manager interprets a request for changing the status of a debug object program, from a user, and instructs said execution-status manager to change the status.

7. The distributed debugger system defined in claim 6, wherein said program manager and said debug object manager are realized on the same distributed system construction foundation and wherein program manager uses a communication function provided by said distributed system construction foundation.

8. The distributed debugger system defined in claim 1, wherein said process manager in said executor within said program manager changes its operation according to the operation of a debug object program and changes the status of said execution-status manager within the same executor based on the changed content.

9. The distributed debugger system defined in claim 8, wherein said program manager and said debug object manager are realized on the same distributed system construction foundation and wherein program manager uses a communication function provided by said distributed system construction foundation.

10. A debugging method, suitable in use for a distributed debugger system that debugs a distributed system configured of a program which runs on plural computers, said method comprising the step of:

implementing a program management from a predetermined computer to other computers via a network interconnecting said computers, said program management being related to the setting status and execution status of a debug object program to be executed on each of said computers, wherein said program management step comprises the sub-steps of:

transmitting an instruction of a setting change from a user or other computers to each of said debuggers constructing said distributed debugger system;

changing the setting in response to said instruction;

deciding whether or not said instruction has come from other of said computers; and notifying said debuggers on said other computers of said instruction via communications sent over a network which communicatively couples said plural computers only when said instruction has not come via the network but instead has come from a same one of said computers that said debugger operates on;

wherein each of said debuggers constructing said distributed debugger system implements the steps of:

receiving an instruction of a change in execution status;

deciding whether or not said instructed status corresponds to a change to the same status as a current status;

changing the status when the instructed status is not the same as the current status;

deciding whether or not said execution status change is instructed according to a change of the management status of a debug object program;

instructing said debugger on other computer to change the execution status via communications sent over the network when the status change is instructed due to a change of the management status of said debug object program, the instructing being performed upon occurrence of a temporary halt status due to detecting of a breakpoint;

deciding whether or not a debugger is said debugger which is managing said debug object program when the status change is not instructed due to a change of the management status of said debug object program; and changing the management status of said debug object program in accordance with the status changed when a debugger is said debugger which is managing said debug object program;

wherein the same execution status is maintained on all computers on which said distributed debugger system operates.

11. The debugging method defined in claim 10, wherein each of said debuggers constructing said distributed debugger system implements the steps of:

receiving an instruction for displaying a status from a user;

interpreting said instruction;

specifying one or more specified status existence places;

transmitting a status capture request to debuggers at all existence places;

acquiring the status of a debug object program by means of said debugger which has received said status capture request;

acknowledging the acquired status to said debugger being a request source;

receiving all replies by means of said debugger being a request source; and outputting contents of received replies in a batch mode to said user;

wherein said user acquires the status inside said distributed system to be debugged, without recognizing the existence place.

12. The debugging method defined in claim 10, wherein each of said debuggers constructing said distributed debugger system implements the steps of:

receiving an instruction of a change in execution status;

deciding whether or not said instructed status corresponds to a change to the same status as a current status;

changing the status when the instructed status is not the same as the current status;

deciding whether or not said execution status change is instructed according to a change of the management status of a debug object program;

instructing said debugger on other computer to change the execution status via communications sent over the network when the status change is instructed due to a change of the management status of said debug object program;

deciding whether or not a debugger is said debugger which is managing said debug object program when the status change is not instructed due to a change of the management status of said debug object program; and changing the management status of said debug object program in accordance with the status changed when a debugger is said debugger which is managing said debug object program;

wherein the same execution status is maintained on all computers on which said distributed debugger system operates.

13. The debugging method defined in claim 12, wherein each of said debuggers constructing said distributed debugger system implements the steps of:

receiving an instruction for displaying a status from a user;

interpreting said instruction;

specifying one or more specified status existence places;

transmitting a status capture request to debuggers at all existence places;

acquiring the status of a debug object program by means of said debugger which has received said status capture request;

acknowledging the acquired status to said debugger being a request source;

receiving all replies by means of said debugger being a request source; and outputting contents of received replies in a batch mode to said user;

wherein said user acquires the status inside said distributed system to be debugged, without recognizing the existence place.

14. The debugging method defined in claim 12, wherein each of said debuggers constructing said distributed debugger system implements the steps of:

receiving an instruction of a status change from a user; and interpreting said instruction and then changing the execution status.

15. The debugging method defined in claim 12, wherein each of said debuggers constructing said distributed debugger system implements the steps of:

monitoring an operation status of a debug object program;
changing the management status of said debug object program when specific requirements are satisfied during monitoring; and
instructing an execution status change in accordance with a management status change.

16. The debugging method defined in claim 10, wherein each of said debuggers constructing said distributed debugger system implements the steps of:
receiving an instruction for displaying a status from a user;
interpreting said instruction;
specifying one or more specified status existence places;
transmitting a status capture request to debuggers at all existence places;
acquiring the status of a debug object program by means of said debugger which has received said status capture request;
acknowledging the acquired status to said debugger being a request source;
receiving all replies by means of said debugger being a request source; and
outputting contents of received replies in a batch mode to said user;
wherein said user acquires the status inside said distributed system to be debugged, without recognizing the existence place.

17. A recording medium, on which a control program for a distributed debugger system for debugging a distributed system constructed by a program which runs on plural computers is recorded, said recording medium recording a program management step of executing a management from a specific computer to other computers via a network interconnecting plural computers, said management being related to the setting status and execution status of a debug object program executed on each of said computers,
wherein said program management step comprises the steps of:
receiving an instruction of a change of setting from a user or other computers by means of each of debugger constructing said distributed debugger system;
changing the setting in response to said instruction; deciding whether or not said instruction has come from other computers; and
notifying a debugger on other computers of the instruction via communications over a network communicatively connecting said plural computers only when said instruction has not come via the network but instead has come from a same one of said computers that said debugger operates on;
wherein each of said debuggers constructing said distributed debugger system implements the steps of:
receiving an instruction of an execution status change;
deciding whether or not the instructed status is a change to the same status as a current status;
changing the status when the instructed status is not the same as the current status;
instructing an execution status change to said debugger on other computers via communications sent over the network when a status change is instructed in accordance with a change of the management status of the debug object program, the instructing being performed upon occurrence of a temporary halt status due to detecting of a breakpoint;
deciding whether or not said debugger managing the debug object program when a status change is not instructed in accordance with a change of the management status of the debug object program; and
changing the management status of a debug object program in accordance with the status changed when a debugger is said debugger managing the debug object program;
wherein the same execution status is maintained on all computers on which said distributed debugger system is operated.

18. The recording medium defined in claim 17, wherein each of said debuggers constructing said distributed system implements the steps of:
receiving an instruction for displaying the status from a user;
interpreting said instruction;
specifying one or more existence places in the specified status;
transmitting a status capture request to debuggers at all specified existence places;
acquiring the status of the debug object program by means of said debugger which has received the status capture request;
returning the acquired status to said debugger being a request source;
receiving all replies by means of said debugger being a request source; and
outputting contents of said received replies to said user in a batch mode;
wherein said user acquires the status inside a distributed system to be debugged, without recognizing the existence place.

19. The recording medium defined in claim 17, wherein each of said debuggers constructing said distributed debugger system implements the steps of:
receiving an instruction of an execution status change;
deciding whether or not the instructed status is a change to the same status as a current status;
changing the status when the instructed status is not the same as the current status;
instructing an execution status change to said debugger on other computers via communications sent over the network when a status change is instructed in accordance with a change of the management status of the debug object program;
deciding whether or not said debugger managing the debug object program when a status change is not instructed in accordance with a change of the management status of the debug object program; and
changing the management status of a debug object program in accordance with the status changed when a debugger is said debugger managing the debug object program;
wherein the same execution status is maintained on all computers on which said distributed debugger system is operated.

20. The recording medium defined in claim 19, wherein each of said debuggers constructing said distributed system implements the steps of:
monitoring the operation status of a debug object program;
changing the management status of the debug object program when specific requirements are satisfied during monitoring; and
instructing a change in execution status in accordance with a change in management status.

21. The recording medium defined in claim 17, wherein each of said debuggers constructing said distributed system implements the steps of:
- receiving an instruction for displaying the status from a user;
- interpreting said instruction;
- specifying one or more existence places in the specified status;
- transmitting a status capture request to debuggers at all specified existence places;
- acquiring the status of the debug object program by means of said debugger which has received the status capture request;
- returning the acquired status to said debugger being a request source;
- receiving all replies by means of said debugger being a request source; and
- outputting contents of said received replies to said user in a batch mode;
- wherein said user acquires the status inside a distributed system to be debugged, without recognizing the existence place.

22. The debugging method defined in claim 10, wherein the notifying step notifies said other computers of said instruction via the network only when said instruction is a common instruction and is not an inherent instruction specific for a particular one of said computers on which said debugger operates.

23. The recording medium defined in claim 17, wherein the notifying step notifies said other computers of said instruction via the network only when said instruction is a common instruction and is not an inherent instruction specific for a particular one of said computers on which said debugger operates.

24. The distributed debugger system defined in claim 1, wherein the setting-status manager of said executor only notifies all other computers in which said distributed debugger operates of the change in setting only when the change in setting originated at a same computer on which said executor operates.

25. The debugging method defined in claim 10, wherein the setting-status manager of said executor only notifies all other computers in which said distributed debugger operates of the change in setting only when the change in setting originated at a same computer on which said executor operates.

* * * * *